United States Patent Office 2,953,240
Patented Sept. 20, 1960

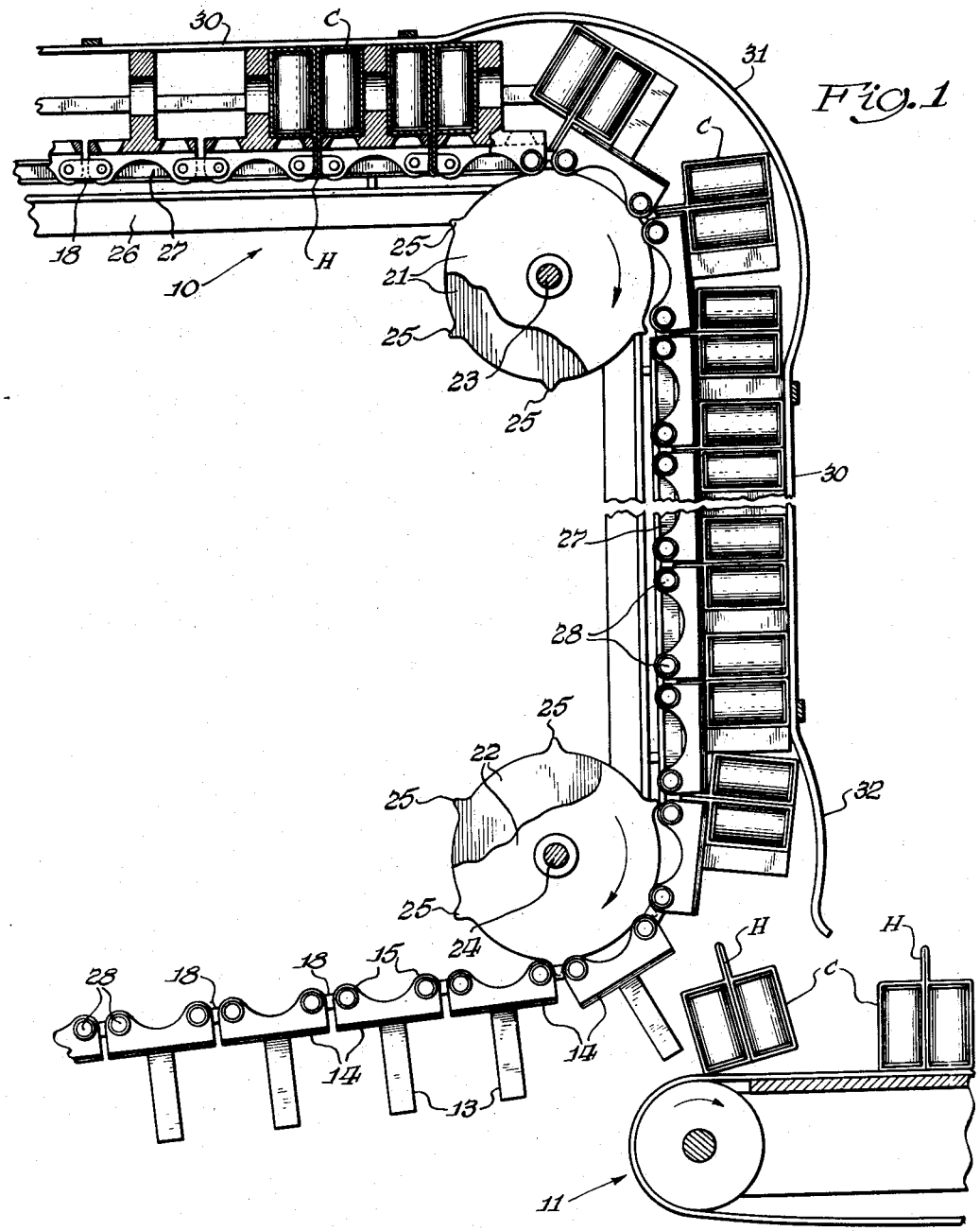

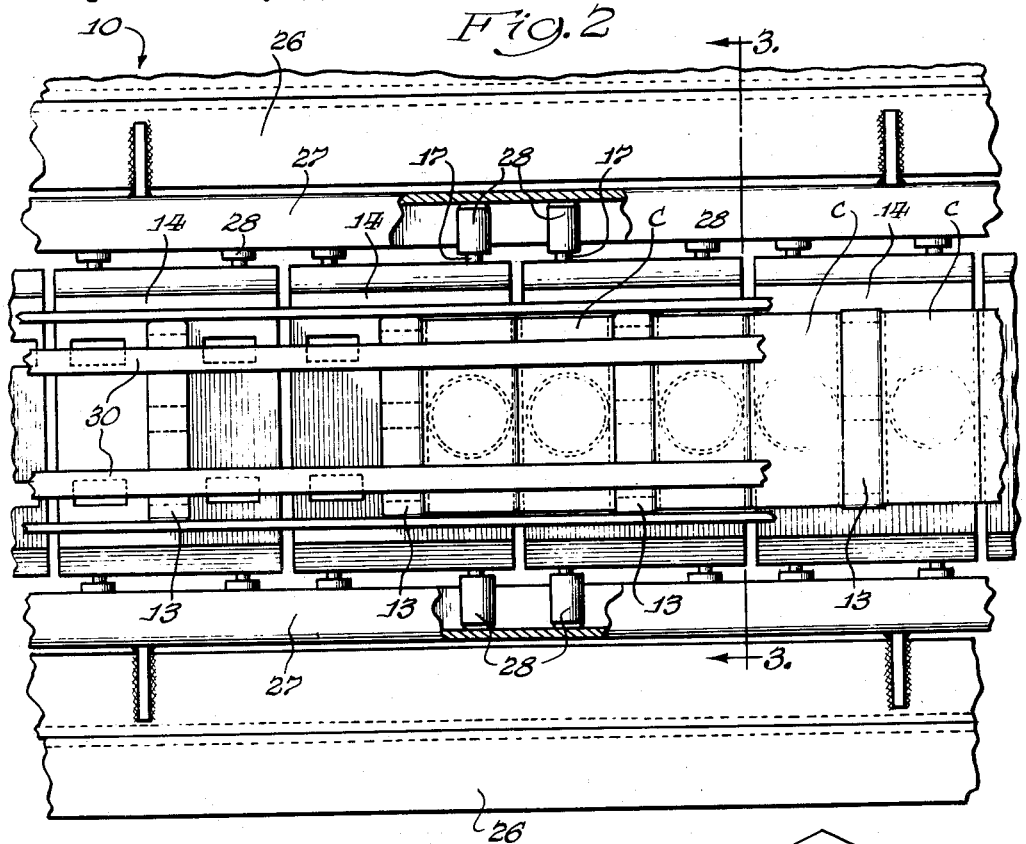
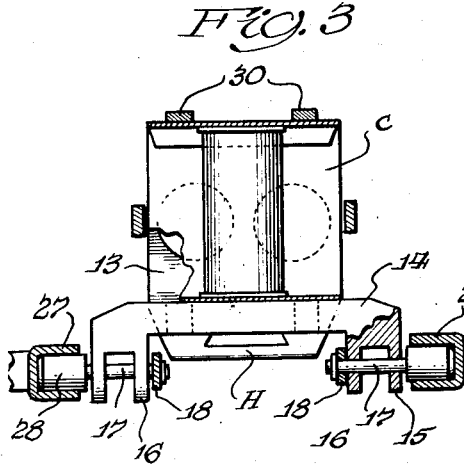
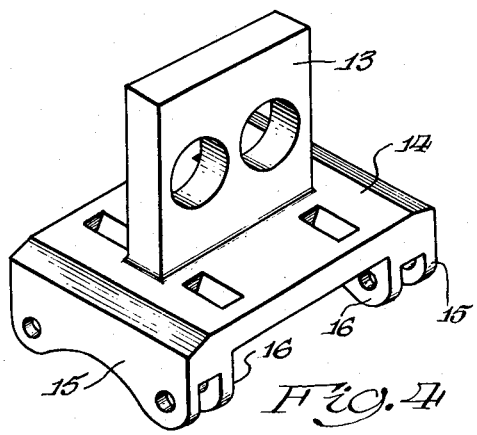

2,953,240

PACKAGE CONVEYOR

Biagio J. Nigrelli, Northbrook, Wendell E. Standley, Lake Forest, Richard B. Wittmann, Chicago, and Burton K. Snyder, Clarendon Hills, Ill., assignors to Ralph W. Johns, Biagio J. Nigrelli, and Robert R. Johns, doing business as Johns-Nigrelli-Johns, Chicago, Ill., a co-partnership Original application May 9, 1956, Ser. No. 583,866, now Patent No. 2,803,932, dated Aug. 27, 1957. Divided and this application July 10, 1957, Ser. No. 671,076

1 Claim. (Cl. 198—179)

The present invention relates to conveyors and particularly to conveying mechanism adapted to carry articles or packages of rectangular shape.

Among the objects of the invention are to provide a simple and sturdy form of conveyor having flight members which are adapted to form a series of pockets within which articles or packages, such as open end, sleeve-type cartons, may be held accurately and firmly with the result that the conveyor structure is well adapted to cooperate with means for treating the cartons and loading them through their open ends.

Another object is to provide a conveyor structure which, while holding articles firmly during a major part of their travel, is designed to discharge the article by gravity at a point where the direction of travel of the conveyor is changed from a vertically downward direction to a lateral or horizontal travel.

A further object is to provide an efficient form of conveyor flight structure which will accommodate packages provided with upstanding handle members.

Other objects of the invention will become apparent as the description proceeds.

This application is a division of copending application, Serial No. 583,866, now Patent No. 2,803,932, entitled "Machine for Loading Open End Cartons," now Patent No. 2,803,932.

In the drawings:

Fig. 1 is a fragmentary side elevational view, partly in section, showing a portion of a complete endless conveyor constructed in accordance with the invention;

Fig. 2 is a plan view of the construction shown in Fig. 1;

Fig. 3 is a cross-sectional view taken along line 3—3 of Fig. 2; and

Fig. 4 is a perspective view of a single flight member.

The conveyor structure as herein disclosed is preferably formed as an endless chain of article supporting and carrying members, each having a base portion, to which connecting links may be attached, and a projecting portion, located centrally of the base portion and extending transversely of the direction of travel of the conveyor, the side portions of which are adapted to contact the sides of articles being conveyed.

The linkage connecting the supporting and carrying members is preferably so constructed as to adapt these members to accommodate upstanding handles on packages carried by the conveyor. In the most common practice the handles are formed centrally of the package and are arranged to extend transversely of the travel of the conveyor. The handles are disposed between the flight members. Half of the top portion of the package will engage one flight member and half will engage the next adjacent flight member.

Referring to the drawings, the conveyor as a whole is indicated at 10, illustrated as traveling in a vertical plane, although it could with equal facility be arranged to travel in a plane other than vertical. An off-bearing conveyor 11 is arranged below the conveyor 10 to carry away the filled packages discharged from such conveyor.

The packages to be handled by the conveyor 10 are indicated at C, C, and each has a centrally positional upstanding handle H.

The conveyor 10 comprises essentially a series of pockets open on three sides. The pockets are formed by T-shaped members each having an outwardly projecting flight portion 13 having its inner end joined centrally to a supporting portion 14. The supporting portions 14 are provided with lugs 15, 15 having projecting leg portions 16, 16 formed with openings to receive pins 17. Links 18 connect the pins of one T-shaped member at both edges to its adjacent member. The length of the individual links is such that the adjacent ends of the supporting portions 14, 14 will be spaced sufficiently to receive the carton handles therebetween. That is, the package handles will be disposed in edgewise relation to the links 18, 18 and will be received between adjacent lug portions 15, 15 on adjacent flight members.

The supporting portions 14, 14 and links 18, 18 thus comprise in effect a sprocket chain which is arranged to travel over pairs of sprockets 21, 21 and 22, 22 mounted on shafts 23 and 24, respectively, and journalled in the conveyor supporting frame. The pins 17, 17 engage the edge of the sprockets, one on each side of the individual sprocket teeth 25, 25. The sprockets may be driven by any suitable driving means which may be connected to one of the shafts 23 or 24.

The conveyor members in the space between the sprockets are supported in their travel by frame members 26, 26 upon which channel members 27, 27 are secured. These channel members are designed to receive rollers 28 fitted on the outer ends of the pins 17.

Cartons are delivered to the conveyor in such manner that the handles H will be received between the ends 14, 14 of adjacent T-shaped conveyor members. As the cartons, illustrated herein, have open ends and the conveyor structure leaves an unobstructed passage into the carton ends, the cartons may be loaded with articles such as cylindrical cans by inserting them into the open carton ends. Guide rails 30 having an outwardly extending, curved portion 31 adjacent the sprockets 21 are preferably employed to retain the filled cartons from accidental displacement.

As the conveyor elements pass downward and around the sprockets 22 the projecting portion 13 of the conveyor element moves in an arc which has its center in shaft 24. This rotary movement causes the adjacent faces of the supporting portions 14, 14 to separate as well as causing angular separation of the portions 13, 13 of the adjacent conveyor elements. This action releases the filled cartons from the conveyor pockets, and the filled cartons thus are free to slide off the portions 13 and onto the conveyor 11. An outwardly flared portion 32 at the lower end of the guide rail controls the discharge movement of the filled carton and prevents it from sliding off the portion 13 until the carton arrives at a point where it is in reasonably close proximity to the conveyor 11.

The sprockets over which the conveyor passes have widely spaced teeth which engage the conveyor only between the adjacent pins 17, 17. A more or less conventional form of sprocket tooth may be employed on the sprockets 21 and 22. It is only necessary that the teeth be of such form that, as the T-shaped member moves in a pivotal manner about the pair of sprocket teeth that have just been engaged, the pins 17, 17 at the other edge of the T-shaped member will swing into proper engaging relation with the next set of teeth. By having the T-shaped members constructed to form a part of the sprocket chain the construction is simplified and maximum economy of parts may be achieved.

While the conveyor has been described as being particularly adapted to the carrying of cartons provided with handles, it is to be understood that it is equally well adapted to convey cartons which are not provided with handles.

Due to the sturdy construction of the T-shaped members and the provision of rollers 28, 28 on the extended end portions of the sprocket teeth engaging pins 17, the T-shaped members may be guided along the roller-receiving channel members 27, 27 to move with a high degree of accuracy. This enables the conveyor structure to cooperate effectively with suitable carton treating and loading elements during continuous travel of the conveyor as more fully disclosed in our co-pending application Ser. No. 583,866.

While the present description sets forth a preferred embodiment of the invention, numerous changes may be made in this construction without departing from the spirit of the invention, and it is therefore desired that the present embodiment be considered in all respects as illustrative and not restrictive, reference being had to the appended claim rather than to the foregoing description to indicate the scope of the invention.

We claim:

A conveyor adapted to carry cartons of the type having a flat top portion and a handle portion extending upwardly at right angles thereto, said conveyor comprising a plurality of rectangular shaped, integrally formed supporting members, each having a flat supporting surface for the top portion of a carton placed in inverted position thereon, pairs of spaced legs depending from each corner portion of the supporting members and disposed to extend in line with the conveyor travel, short links arranged to connect each of the corners of the supporting members with corners of adjacent supporting members, the respective end portions of such links being disposed against the inside leg of each pair of legs, each of said pairs of legs and the respective adjacent end portions of the links being formed with registering openings extending transversely of the direction of conveyor travel, link pins received in such registering openings, said supporting members having flat face portions normal to the flat supporting surfaces of said members, the spacing of such face portions on adjacent supporting members being such that the adjacent face portions are adapted to receive in close engaging relation a handle of a carton when resting in inverted position on adjacent supporting members, the effective spacing between the pins connecting the link ends at adjacent corners of the supporting members being one-third of the effective spacing between the pins at the sides of the individual supporting members, such conveyor including sprockets having teeth spaced to be received only between the pins at the ends of the links.

References Cited in the file of this patent

UNITED STATES PATENTS

| 530,183 | Johnston et al. | Dec. 4, 1894 |
| 807,541 | Cunningham et al. | Dec. 19, 1905 |
| 1,653,035 | Burns | Dec. 20, 1927 |
| 2,307,976 | Walz et al. | Jan. 12, 1943 |

FOREIGN PATENTS

| 992,684 | France | July 11, 1951 |